United States Patent
Haldar

(10) Patent No.: US 9,937,573 B2
(45) Date of Patent: Apr. 10, 2018

(54) POWER TOOL WITH DETECTION SYSTEM

(71) Applicant: Arindam Haldar, Bangalore (IN)

(72) Inventor: Arindam Haldar, Bangalore (IN)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 338 days.

(21) Appl. No.: 14/758,417

(22) PCT Filed: Oct. 9, 2013

(86) PCT No.: PCT/IN2013/000612
§ 371 (c)(1),
(2) Date: Jun. 29, 2015

(87) PCT Pub. No.: WO2014/102811
PCT Pub. Date: Jul. 3, 2014

(65) Prior Publication Data
US 2015/0367431 A1  Dec. 24, 2015

(30) Foreign Application Priority Data

Dec. 31, 2012  (IN) .......................... 5546/CHE/2012

(51) Int. Cl.
*B23D 59/00* (2006.01)
*B27G 19/02* (2006.01)
(Continued)

(52) U.S. Cl.
CPC ......... *B23D 59/008* (2013.01); *B23D 45/065* (2013.01); *B23D 47/08* (2013.01);
(Continued)

(58) Field of Classification Search
CPC .. B23D 59/008; B23D 59/001; B23D 45/065; B23D 45/06; B23D 45/061; B23D 45/062; B23D 45/066; B23D 45/067; B23D 45/068; B23D 47/08; B23D 47/10; Y10T 83/141; Y10T 83/081; Y10T 83/088; Y10T 83/089; Y10T 83/773; Y10T 83/8863; Y10S 83/01; B27G 19/02; G05B 19/042; G05B 2219/35491
See application file for complete search history.

(56) References Cited

U.S. PATENT DOCUMENTS 5,650,727 A  7/1997 Lapping et al.
7,628,101 B1  12/2009 Knapp et al.
(Continued)

FOREIGN PATENT DOCUMENTS

| EP | 2 289 679 A2 | 3/2011 |
| WO | 90/01670 A1 | 2/1990 |
| WO | 2012/044377 A1 | 4/2012 |

OTHER PUBLICATIONS

International Search Report corresponding to PCT Application No. PCT/IN2013/000612, dated Feb. 11, 2014 (4 pages).

*Primary Examiner* — Phong Nguyen
(74) *Attorney, Agent, or Firm* — Maginot Moore & Beck LLP

(57) ABSTRACT

A power tool includes a swing arm movable along a swing arm path, an actuating assembly configured to transfer a force to the swing arm, a control system configured to control the actuating assembly to transfer a force to the swing arm, and a detection system configured to detect the operability of the actuating assembly.

9 Claims, 6 Drawing Sheets

(51) Int. Cl.
*B23D 45/06* (2006.01)
*B23D 47/08* (2006.01)
*G05B 19/402* (2006.01)

(52) U.S. Cl.
CPC ........... *B23D 59/001* (2013.01); *B27G 19/02* (2013.01); *G05B 19/402* (2013.01); *G05B 2219/35491* (2013.01); *Y10T 83/141* (2015.04); *Y10T 83/8863* (2015.04)

(56) References Cited

U.S. PATENT DOCUMENTS

| | | |
|---|---|---|
| 2003/0058121 A1 | 3/2003 | Gass et al. |
| 2004/0159198 A1 | 8/2004 | Peot et al. |
| 2005/0268767 A1 | 12/2005 | Pierga et al. |
| 2010/0257990 A1 | 10/2010 | Schell et al. |

| CHECK | COMPARATOR 200 OUTPUT | COMPARATOR 204 OUTPUT |
|---|---|---|
| PYROTECHNIC PRESENT | 1 | 1 |
| PYROTECHNIC SHORT | 0 | 1 |
| PYROTECHNIC OPEN | 1 | 0 |

POWER TOOL WITH DETECTION SYSTEM

This application is a 35 U.S.C. § 371 National Stage Application of PCT/IN2013/000612, filed on Oct. 9, 2013, which claims the benefit of priority to Serial No. 5546/CHE/ 2012, filed on Dec. 31, 2012 in India, the disclosures of which are incorporated herein by reference in their entirety.

FIELD

The present disclosure relates to power tools and more particularly to power tools with exposed shaping devices.

BACKGROUND

A number of power tools have been produced to facilitate forming a work piece into a desired shape. One such power tool is a saw device. A wide range of saw device are available for a variety of uses. For example, some saw device such a cabinet table saws are very heavy and relatively immobile. Other table saws, sometimes referred to as jobsite table saws, are relatively light. Jobsite table saws are thus portable so that a worker can position the table saw at a job site. Some accuracy is typically sacrificed in making a table saw sufficiently light to be mobile. The convenience of locating a table saw at a job site, however, makes job site table saws very desirable in applications such as general construction projects.

All table saws, including cabinet table saws and job site table saws, present a safety concern because the saw blade of the table saw is typically very sharp and moving at a high rate of speed. Accordingly, severe injury such as severed digits and deep lacerations can occur almost instantaneously. A number of different safety systems have been developed for table saws in response to the dangers inherent in an exposed blade moving at high speed. One such safety system is a blade guard. Blade guards movably enclose the saw blade, thereby providing a physical barrier that must be moved before the rotating blade is exposed. While blade guards are effective to prevent some injuries, the blade guards can be removed by a user either for convenience of using the table saw or because the blade guard is not compatible for use with a particular shaping device. By way of example, a blade guard is typically not compatible with a dado blade and must typically be removed when performing non-through cuts.

Table saw safety systems have also been developed which are intended to stop the blade when a user's hand approaches or touches the blade. Various stopping devices have been developed including braking devices which are physically inserted into the teeth of the blade. More recently, systems have been developed which physically move the blade or other shaping instrument below the support surface of the device. One such device incorporates a swing arm assembly which supports a blade above a work piece support surface and swings the blade beneath the work piece support surface when an unsafe condition is sensed. Regardless of the mechanism which is used to physically render a power tool safe, an associated control system must be functional. This is particularly important in systems which incorporate single use devices such as a pyrotechnic charge to move a blade away from a user.

In view of the foregoing, it would be advantageous to provide a power tool with a mitigation system that evaluates the operational status of the mitigation system. A mitigation system that evaluates the same circuitry used to activate a mitigation mechanism would also be advantageous.

SUMMARY

In accordance with one embodiment a table saw includes a latch hold mechanism, a swing arm movable along a swing arm path between a first position adjacent the latch hold mechanism and a second position spaced apart from the latch hold mechanism, a latch movable between a first position whereat the swing arm is maintained at the first position and a second position whereat the swing arm is not maintained at the first position, an actuating assembly configured to transfer a force to the swing arm when the swing arm is maintained at the first position, a control system configured to control the actuating assembly to transfer a force to the swing arm when the swing arm is maintained at the first position sufficient to move the latch from the first position to the second position, and a detection system configured to detect the operability of the actuating assembly.

In another embodiment, a power tool includes a work-piece support surface, a swing arm assembly movable along a swing path between a first swing arm position whereat a portion of a shaping device supported by the swing arm assembly extends above the work-piece support surface and a second swing arm position whereat the portion of the shaping device does not extend above the work-piece support surface, an actuating assembly configured to force the swing arm assembly away from the first swing arm position and toward the second swing arm position, a control system configured to activate the actuating assembly in response to a sensed condition, and a detection system configured to test the functionality of the actuating assembly without activating the actuating assembly.

BRIEF DESCRIPTION OF THE DRAWINGS

The accompanying drawings illustrate various embodiments of the present disclosure and together with a description serve to explain the principles of the disclosure.

Corresponding reference characters indicate corresponding parts throughout the several views. Like reference characters indicate like parts throughout the several views.

DETAIL DESCRIPTION OF THE DISCLOSURE

Figure 1:
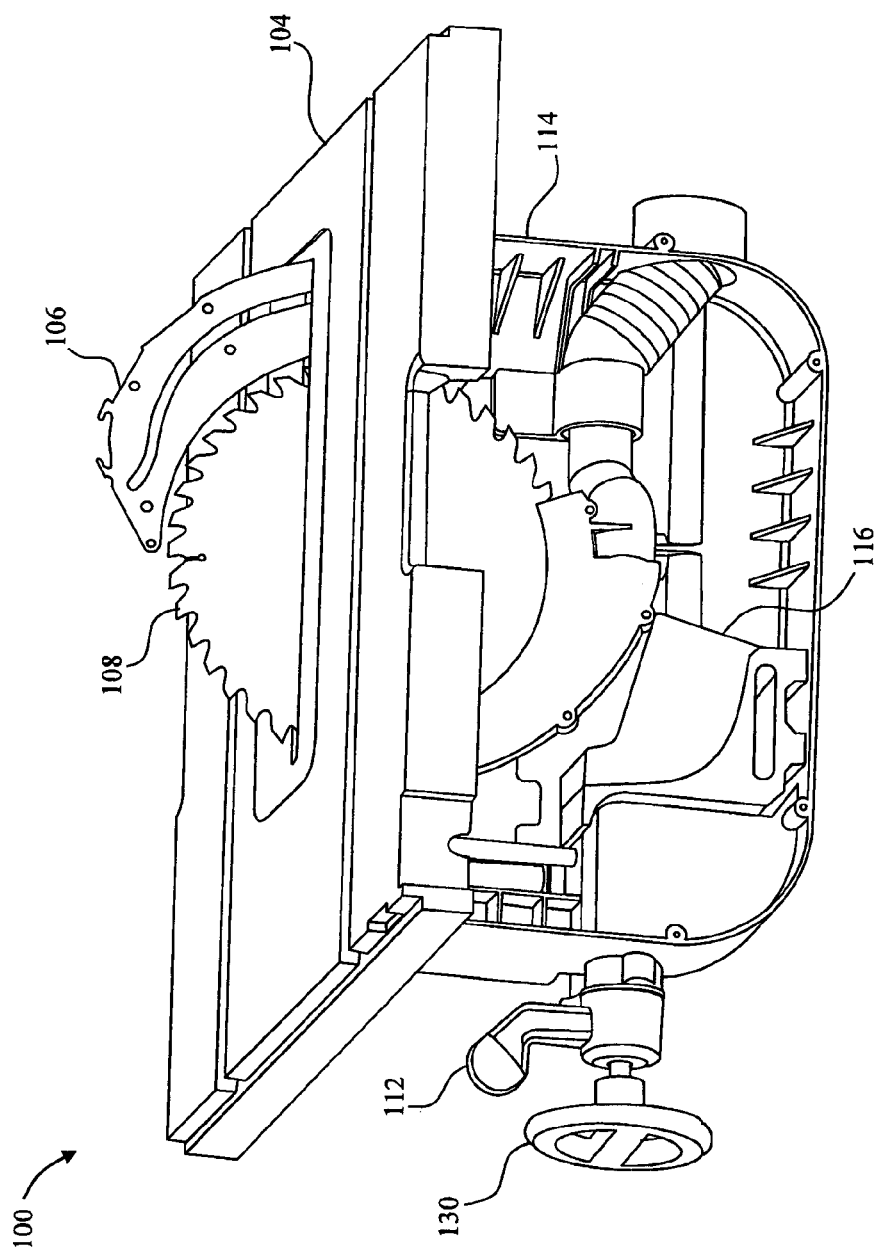
FIG. 1 depicts a top perspective view of a table saw incorporating a mitigation system in accordance with principles of the invention.

While the power tools described herein are susceptible to various modifications and alternative forms, specific embodiments thereof have been shown by way of example in the drawings and will herein be described in detail. It should be understood, however, that there is no intent to limit the power tools to the particular forms disclosed. On the contrary, the disclosure is to cover all modifications, equivalents, and alternatives falling within the spirit and scope of the disclosure as defined by the appended claims.

Referring to FIG. 1, a saw device 100 is shown with a base housing (not shown) removed. The saw device may be, such as, a table saw, a miter saw, a bevel saw, a compound saw, a vertical saw, a stationary saw, a machine saw, a band saw, a jig saw, a chain saw, a circular saw, or other cutting devices with a saw blade. The illustrated device as shown in FIG. 1 is a table saw. The table saw 100 includes a work piece support surface 104. A riving knife or splitter 106 is positioned adjacent to a blade 108 which extends from within the base housing (not shown) to above the work-piece support surface 104. A blade guard (not shown) may be attached to the splitter 106. The angle of the blade 108 with respect to the work-piece support surface 104 is established by pivoting a frame 114 within the base housing (not shown).

The frame 114 supports a stop pad 116. The frame 114 further supports a carriage assembly 120 shown in FIG. 2. The carriage assembly 120 includes a carriage 122 which supports a motor 124 which is powered through a power switch (not shown) located on the base housing (not shown). The carriage 122 is slidably mounted on two guiderails 126/128. The position of the carriage 122 along the guiderails 126/128 is controlled by a blade height turn-wheel 130 through a gearing assembly (not shown) which is connected to a screw post 132. The carriage 124 pivotably supports a latch assembly 140 and pivotably supports a swing arm assembly 142.

Figure 2:
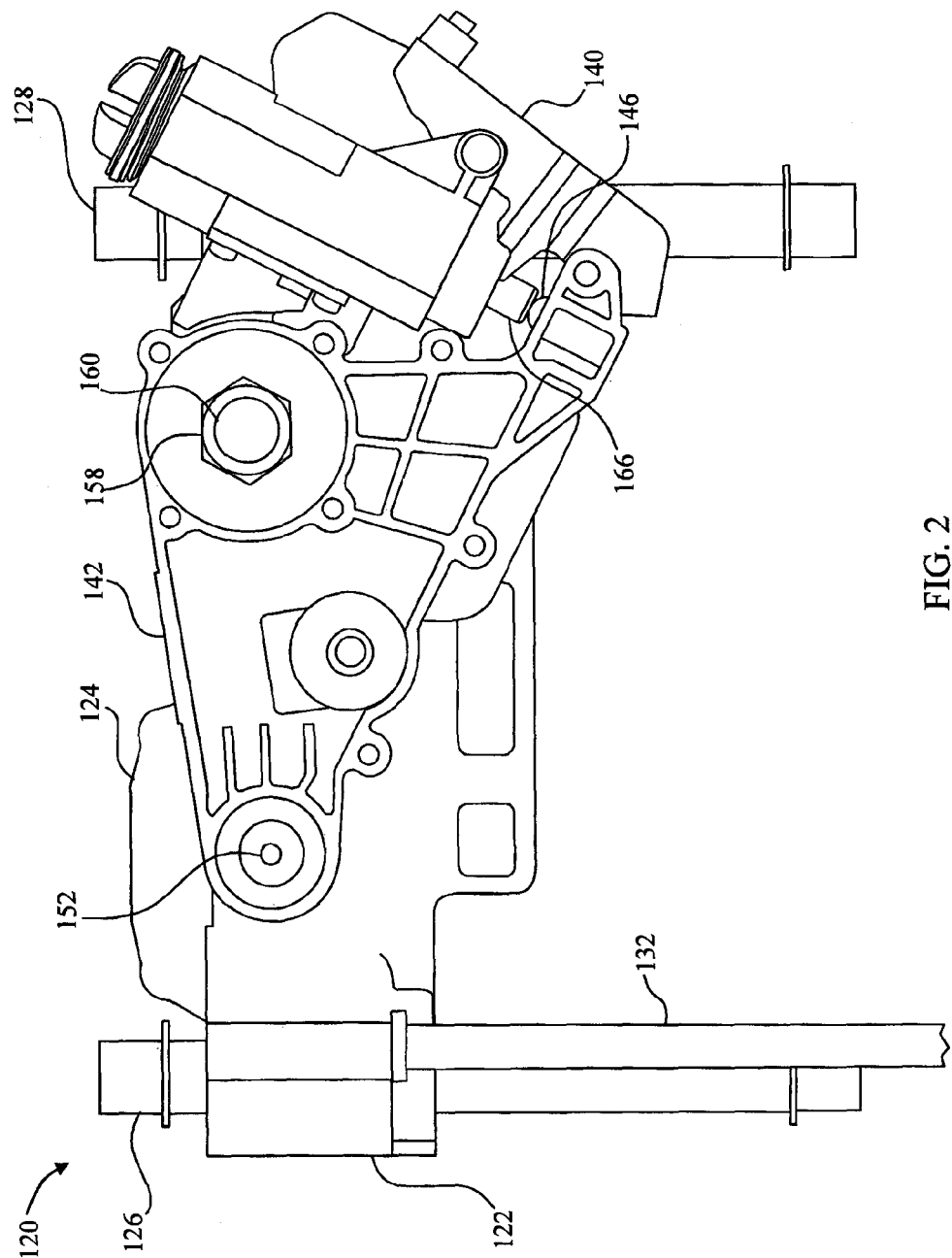
FIG. 2 depicts a side plan view of a carriage assembly, solenoid, and latch assembly of the table saw of FIG. 1 with the swing arm assembly latched.
Figure 3:
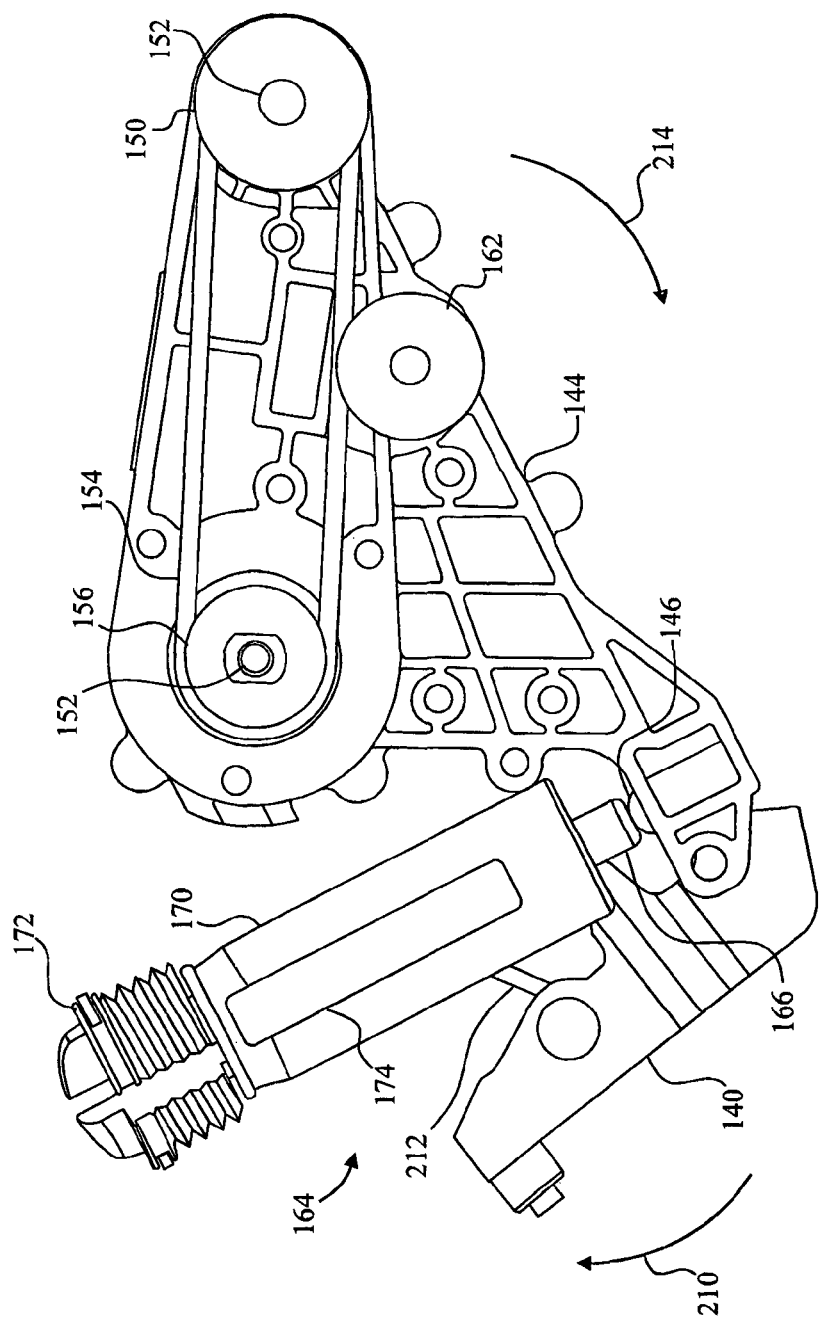
FIG. 3 depicts a side plan view of the solenoid and latch assembly of the table saw of FIG. 1.

The swing arm assembly 142, also shown in FIG. 3, includes a housing 144. A strike bolt 146 is mounted on the housing 144. The housing 144 encloses a power wheel 150 that is driven by an output shaft 152 of the motor 124. A belt 154 transfers rotational movement from the power wheel 150 to a blade wheel 156. A nut 158 is used to affix the blade 108 (not shown in FIGS. 2 and 3 for purpose of clarity) to a shaft 160 of the blade wheel 156. A tensioner 162 maintains the belt 154 at a desired tension.

A solenoid assembly 164 is an actuating assembly which includes a solenoid pin 166 which is aligned with the strike bolt 146 when the swing arm assembly 142 is in a latched position as depicted in FIG. 3. The solenoid assembly 164, in the embodiment of FIGS. 1-3, is a pyrotechnically activated system wherein a pyrotechnic charge is positioned within a receptacle which in this embodiment is a cylinder portion 170 which is closed at one end by a cap 172. Operation of the solenoid assembly 164 is controlled by a control module 174 which is part of a mitigation and control system 180 depicted in FIG. 4.

The mitigation and control system 180 includes a sensing system 182, a controller 184, the motor 124, a detection system 186, and a pyrotechnic module 188. The sensing system 182 in different embodiments is any desired sensing circuit. One acceptable sensing system is a part of the sensing and control circuit described in U.S. Pat. No. 6,922,153, the entire contents of which are herein incorporated by reference. The safety detection and protection system described in the '153 patent senses an unsafe condition and provides a sense signal indicative of the sensed unsafe condition.

The controller 184 one embodiment comprises a microprocessor, ASIC or other type of processing unit. The controller 184 receives the sense signal from the sensor subsystem 182 and, in response to an unsafe condition, fires the pyrotechnic module 188 as discussed more fully below.

Figure 5:
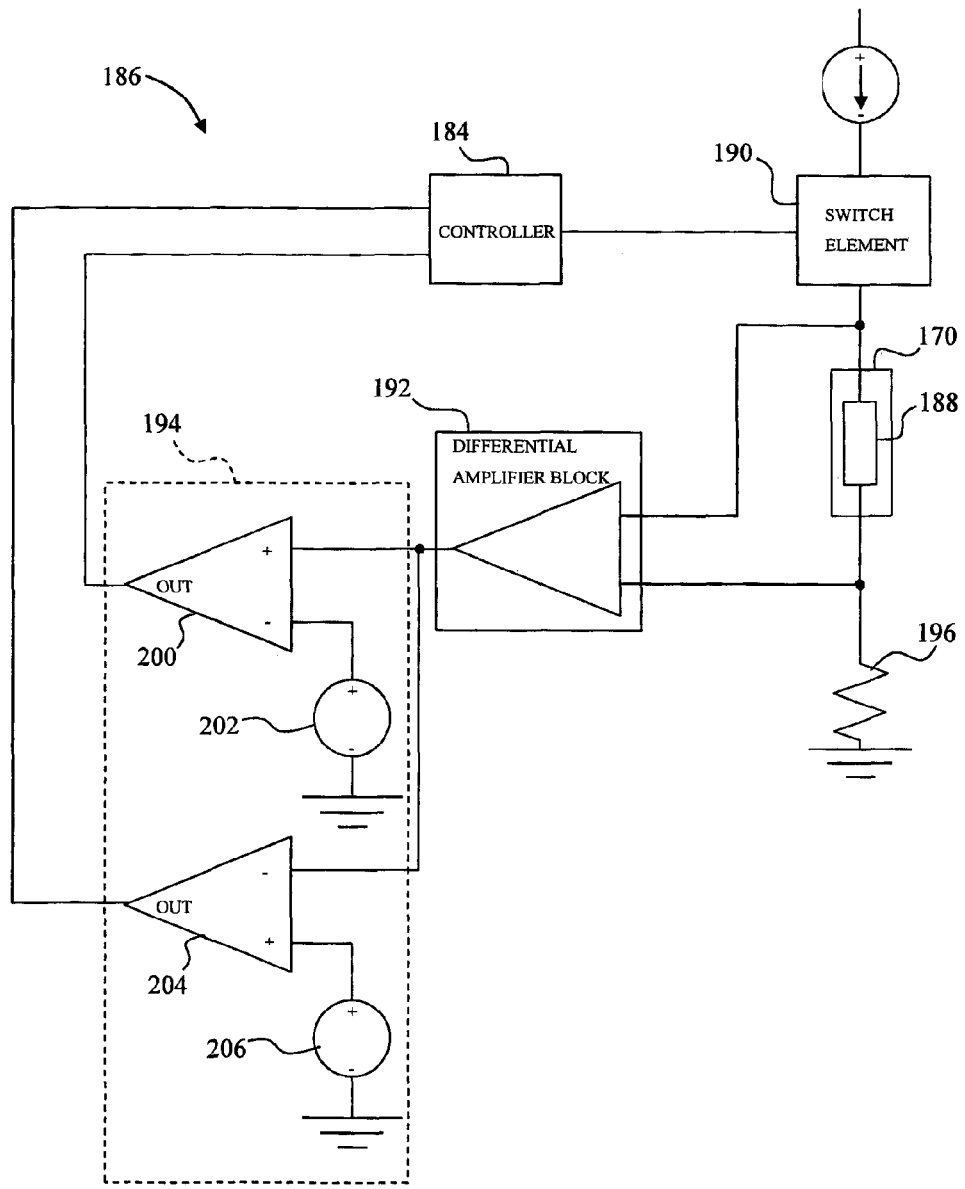
FIG. 5 depicts a schematic of the detection system of FIG. 4.

The detection system 186 is shown in further detail in FIG. 5. The detection system 186 includes a switch 190, a differential block 192, a comparator block 194, and a resistor 196. The controller 184, switch 190, differential block 192, comparator block 194, and resistor 196 are located within the mitigation system control module 174 while the pyrotechnic module 188 is located within the cylinder portion 170 of the solenoid assembly 164. Further details of the mitigation and control system 180 are provided in the following description of the operation of the table saw 100.

Operation of the table saw 100 is described with initial reference to FIGS. 1-3. Initially, the swing arm assembly 142 is maintained in a latched position with the swing arm housing 144 supported by the latch assembly 140 as shown in FIG. 3. In this position, the blade wheel 156 is positioned sufficiently close to the work-piece support surface 104 that the blade 108 extends above the work-piece support surface 104 as shown in FIG. 1. A user operates a bevel adjust turn wheel (not shown) to pivot the frame 114 with respect to the work-piece support surface 104 to establish a desired angle between the blade 108 and the work-piece support surface 104. The user further operates the blade height adjustment turn-wheel 130 to move the carriage 122 along the guiderails 126/128 to establish a desired height of the blade 108 above the work-piece support surface 104.

Using the power switch (not shown), power is applied to the motor 124 under the control of the controller 184. Specifically, positioning of the switch causes the mitigation and control system 180 to be energized. Upon energization of the mitigation and control system 180, the controller 184 controls the switch element 190 to a closed position thereby applying a voltage from a stable DC power rail to the cylinder portion 170. The current (also referred to herein as a "test signal") allowed through the switch element 190, typically on the order of milliamps, is selected to be much less than the current required to fire or activate (hereinafter also referred to as a "firing current") the pyrotechnic module 188. Accordingly, if a pyrotechnic module 188 is loaded in the cylinder portion 170, the pyrotechnic module 188 does not fire and a voltage differential is developed across the pyrotechnic module 188.

The developed voltage difference is applied to the differential amplifier block 192 and an amplified voltage signal based upon the developed voltage difference is provided as an output of the differential amplifier block 192. The output of the differential amplifier block 192 is applied to a first comparator 200 which compares the output to a first reference voltage 202. The first reference voltage is selected to be slightly lower than the expected lowest output of the differential amplifier block 192 if a pyrotechnic module is positioned within the cylinder portion 170. By way of example, in one embodiment a pyrotechnic module exhibits a range of resistance between 1.7-2.3 ohms, dependent upon temperature. Accordingly, the first reference voltage 202 is set to the expected output of the differential amplifier block 192 for a resistance of 1.6 ohms across the cylinder portion 170. Consequently, the first comparator 200 outputs a high value to the controller 184.

The output of the differential amplifier block 192 is also applied to a second comparator 204 which compares the output to a second reference voltage 206. The second reference voltage is selected to be slightly higher than the expected highest output of the differential amplifier block 192 if a pyrotechnic module is positioned within the cylinder portion 170. Using the example above, the second reference voltage 206 is set to the expected output of the differential amplifier block 192 for a resistance of 2.4 ohms across the cylinder portion 170. Consequently, the second comparator 204 outputs a high value to the controller 184.

The controller 184 is configured such that when two high values are received from the comparator block 194, power can be applied to the motor 124. Accordingly, so long as a properly functioning pyrotechnic module 188 is loaded within the cylinder 190, the motor 124 can be energized when the power switch (not shown) is manipulated by a user.

In the event that no pyrotechnic module 188 is loaded within the cylinder 170, then there is no voltage drop across the resistor 196. Accordingly, the voltage drop applied to the differential amplifier block 194 will be much higher than the voltage applied when a pyrotechnic module 188 is loaded. Using the above described example, since the first reference voltage 202 is set to the expected output of the differential amplifier block 192 for a resistance of 1.6 ohms across the cylinder portion 170, the first comparator 200 outputs a high value to the controller 184. However, since the second reference voltage 206 is set to the expected output of the differential amplifier block 192 for a resistance of 2.4 ohms across the cylinder portion 170 and the output of the differential amplifier block 192 is subtracted from the second reference voltage 206, the second comparator 204 outputs a low value to the controller 184.

Therefore, if there is no pyrotechnic module 188, or if the loaded pyrotechnic module 188 has already been fired and is no longer operable, the controller 184 will not allow power to be applied to the motor 124.

In the event that a defective pyrotechnic module 188 is loaded within the cylinder 170 which results in a short circuit (or in any other event leading to a short circuit within the cylinder portion 170), then there is no voltage drop across the cylinder portion 170. Accordingly, the voltage drop applied to the differential amplifier block 194 will be much lower than the voltage applied when a pyrotechnic module 188 is loaded. Using the above described example, since the first reference voltage 202 is set to the expected output of the differential amplifier block 192 for a resistance of 1.6 ohms across the cylinder portion 170, the first comparator 200 outputs a low value to the controller 184. Since the second reference voltage 206 is set to the expected output of the differential amplifier block 192 for a resistance of 2.4 ohms across the cylinder portion 170 and the output of the differential amplifier block 192 is subtracted from the second reference voltage 206, the second comparator 204 outputs a high value to the controller 184.

Therefore, if there is a defective pyrotechnic module 188, or if there is another condition resulting in a short circuit within the cylinder portion 170, the controller 184 will not allow power to be applied to the motor 124.

Figures 4, 6:
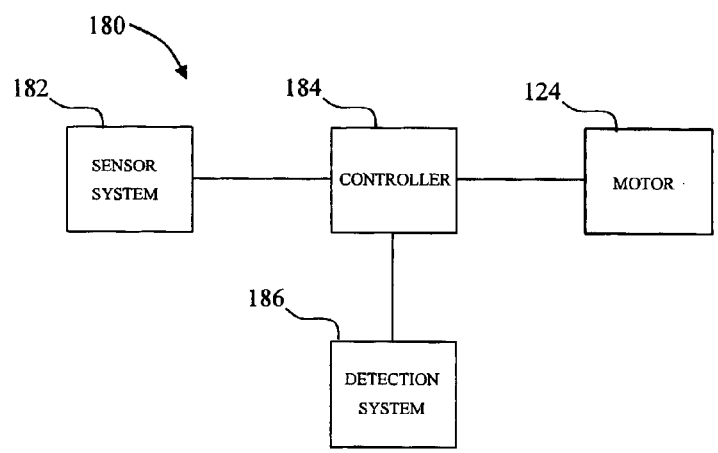
FIG. 4 depicts schematic of the mitigation and control system of the table saw of FIG. 1.
FIG. 6 depicts a table of the outputs of the comparator block of the detection system of FIG. 5.

The above described scenarios are depicted in tabular form in FIG. 6. The mitigation and control system 180 thus ensures that the mitigation system is functional prior to allowing power to be applied to the motor 124. Additionally, in some embodiments the controller 184 is configured to periodically apply the DC rail voltage through the switch element 190 during operation of the motor 124. Accordingly, if the pyrotechnic module 188 becomes dysfunctional during operation of the table saw 100, the power to the motor 124 is interrupted.

Continuing with a description of the operation of the table saw 100, once the mitigation and control system 180 verifies that the pyrotechnic module 188 is installed and functional, power is applied to the motor 124 causing the output shaft 152 and the power wheel 150 to rotate. Rotation of the power wheel 150 causes the belt 154 to rotate the blade wheel 156 and the blade 108 which is mounted on the blade wheel 156. A work-piece may then be shaped by moving the work-piece into contact with the blade 108.

During operation of the table saw 100, the mitigation and control system 180 monitors for an unsafe condition using the sensor system 182. If an unsafe condition is detected, the controller 184 actuates the pyrotechnic module 188. Upon actuation of the pyrotechnic module 188, the solenoid pin 166 is forced outwardly from the solenoid assembly 164. When the swing arm assembly 142 is maintained in a latched position with the housing 144 supported by the latch assembly 140 as shown in FIG. 3, the strike bolt 146 is aligned with the solenoid pin 166. Accordingly, as the solenoid pin 166 is forced out of the solenoid assembly 164, the solenoid pin 166 impacts the strike bolt 146.

Figure 7:
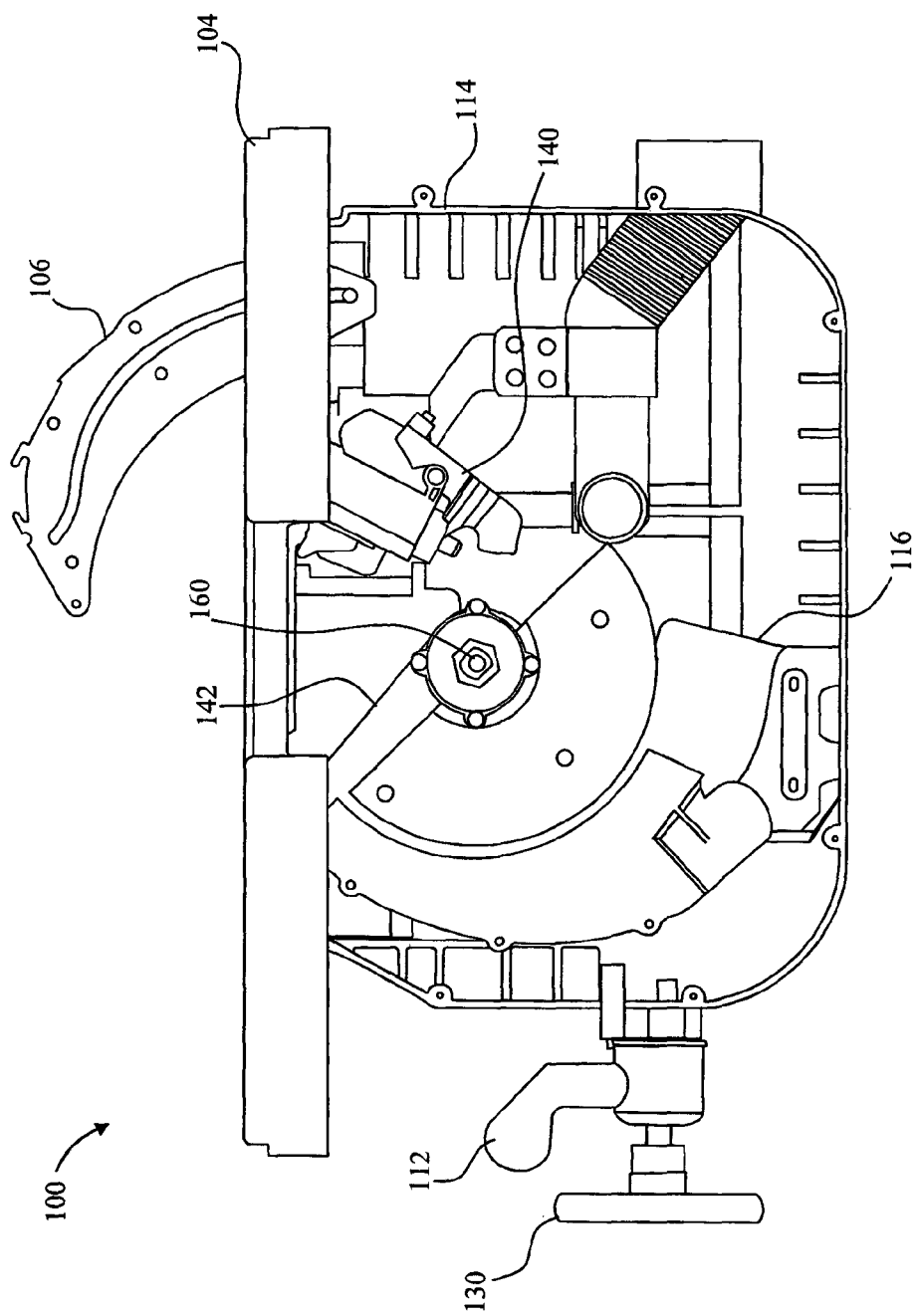
FIG. 7 depicts a side plan view of the table saw of FIG. 1 with the swing arm assembly unlatched.

The shape of the housing 144 and the latch assembly 140 is selected such that the impact of the solenoid pin 166 on the strike bolt 166 generates a force tending to rotate the latch assembly 140 in the direction of the arrow 210 in FIG. 3 against a spring 212. The spring constant of the spring 212 and the force generated by the pyrotechnic module 188 are selected such that when the solenoid pin 166 impacts the strike bolt 146 the generated force is sufficient to compress the spring 212 and to force the latch assembly 140 to rotate into a position whereat the swing arm assembly 142 is no longer maintained in position adjacent to the latch assembly 140. Consequently, the swing arm assembly 142 pivots about the output shaft 152 in the direction of the arrow 214 of FIG. 3 such that the blade wheel 156 moves away from the work-piece support surface 104 to the position shown in FIG. 7. Accordingly, the blade 108 (not shown in FIG. 7 for purpose of clarity) is pulled by the swing arm assembly 142 in a direction away from the work-piece support surface 104.

Once the pyrotechnic module 188 has fired, the pyrotechnic module 188 no longer provides a path for current to flow. Accordingly, the fired pyrotechnic module 188 is an electrical "open" for the purposes of the detection circuit 186. Consequently, until the pyrotechnic module 188 is replaced, the second comparator 204 outputs a low signal and power is not provided to the motor 124.

Once the sensed condition has been cleared, the swing arm assembly 142 is reset by moving the latch assembly 140 out of the swing path. This is effected by compressing the spring 212. The swing arm assembly 142 may then be rotated in a counterclockwise direction about the output shaft 152 until the housing 144 is adjacent to the latch assembly 140. The latch assembly 140 is then released and the spring 212 biases the latch assembly 140 into contact with the housing 144, returning to the condition of FIG. 3.

The table saw 100 thus actively monitors for an unsafe condition and initiates mitigation action automatically in the event an unsafe condition is sensed. Additionally, the table saw 100 ensures that a functional pyrotechnic device 188 is loaded before allowing or continuing to allow energy to be supplied to the motor 124.

The mitigation system discussed with respect to the table saw 100 can be implemented using very light materials, and is thus amenable to incorporation into a variety of power tools including bench top saws and portable saws. For example, the components which are subjected to increased stress within the mitigation system, such as the solenoid pin 166, swing arm assembly 142, and the strike bolt 146, can be made of more durable materials including metals to withstand the impacts and stresses of activating the mitigation system. Other components, including the housings, may be fabricated from more lightweight materials to minimize the weight of the power tool.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. A saw device, comprising:
 a swing arm movable along a swing arm path between a first swing arm position and a second swing arm position;
 an actuating assembly configured to transfer a force to the swing arm resulting in a bias on the swing arm in a direction toward the swing arm position, the actuator assembly including a pyrotechnic module;
 a control system configured to control the actuating assembly wherein the control system is configured such that power is not provided to a motor of the saw device when the detection system outputs a signal indicating that the actuating assembly is not operable; and
 a detection system configured to detect the operability of the actuating assembly without activating the actuating assembly, the detection system including a comparator block comprising a first comparator, a first voltage reference operably connected to the first comparator, a second comparator, a second voltage reference operably connected to the second comparator, and the comparator block being configured to:
  generate a first output when the pyrotechnic module is installed in the actuating assembly;
  generate a second output when the pyrotechnic module acts as an open or is not installed in the actuating assembly; and
  generate a third output when the pyrotechnic module acts as a short in the actuating assembly, each of the first output, the second output, and the third output is different from the other of the first output, the second output, and the third output;
  wherein the first voltage reference is configured to apply a first reference signal to a first input of the first comparator which is less than the expected lowest signal applied to a second input of the first comparator when the pyrotechnic module is positioned within the actuating assembly and a test signal is applied to the pyrotechnic module; and
  the second voltage reference is configured to apply a second reference signal to a first input of the second comparator which is greater than the expected highest signal applied to a second input of the second comparator when the pyrotechnic module is positioned within the actuating assembly and the test signal is applied to the pyrotechnic module.

2. The saw device of claim 1, further comprising:
 a receptacle configured to receive the pyrotechnic module; and
 a differential amplifier block configured to detect a voltage difference across the receptacle when the test signal is applied to the receptacle, the differential amplifier block including an output operably connected to the second input of the first comparator and the second input of the second comparator.

3. The saw device of claim 2, further comprising:
 a switch element having an input operably connected to a power supply and an output operably connected to the receptacle; and
 a controller operably connected to an output of the first comparator and an output of the second comparator, the controller operably connected to the switch element for selectively operably connecting the power supply to the receptacle through the switch element.

4. The saw device of claim 3, wherein the test signal is substantially less than a firing current used to activate the actuating assembly.

5. A power tool comprising:
 a table;
 a cutting tool supported in a way that extends above the table at an operator defined height during normal operation and can be moved under the table in response to a sensed condition;
 an actuating assembly configured to force the cutting tool under the table, the actuating assembly includes a pyrotechnic module;
 a control system configured to activate the actuating assembly in response to a sensed condition; and
 a detection system configured to test the functionality of the actuating assembly without activating the actuating assembly, the detection system including a comparator block comprising a first comparator, a first voltage reference operably connected to the first comparator, a second comparator, and a second voltage reference operably connected to the second comparator, the comparator block being configured to:
  generate a first output when the pyrotechnic module is installed in the actuating assembly;
  generate a second output when the pyrotechnic module acts as an open or is not installed in the actuating assembly; and
  generate a third output when the pyrotechnic module acts as a short in the actuating assembly, each of the first output, the second output, and the third output is different from the other of the first output, the second output, and the third output;
  wherein the first voltage reference is configured to apply a first reference signal to a first input of the first comparator which is less than the expected lowest signal applied to a second input of the first comparator when the pyrotechnic module is positioned within the actuating assembly and a test signal is applied to the pyrotechnic module; and
  the second voltage reference is configured to apply a second reference signal to a first input of the second comparator which is greater than the expected highest signal applied to a second input of the second comparator when the pyrotechnic module is positioned within the actuating assembly and the test signal is applied to the pyrotechnic module.

6. The power tool of claim 5, wherein the control system is configured such that power is not provided to a motor of the table saw when the detection system outputs a signal indicating that the actuating assembly is not functional.

7. The power tool of claim 5, further comprising:
 a receptacle configured to receive the pyrotechnic module; and
 a differential amplifier block configured to detect a voltage difference across the receptacle when the test signal is applied to the receptacle, the differential amplifier block including an output operably connected to a first input of the first comparator and a first input of the second comparator.

8. The power tool of claim 7, further comprising:
a switch element having an input operably connected to a power supply and an output operably connected to the receptacle; and
a controller operably connected to an output of the first comparator and an output of the second comparator, the controller operably connected to the switch element for selectively operably connecting the power supply to the receptacle through the switch element.

9. The power tool of claim 8, wherein the test signal is substantially less than a firing current used to activate the actuating assembly.

\* \* \* \* \*